Dec. 6, 1966                W. D. ISCH ETAL                3,289,225
              CONVERTIBLE TRAILER AND PONTOON BOAT CONSTRUCTION
Filed Feb. 1, 1965                                    2 Sheets-Sheet 1
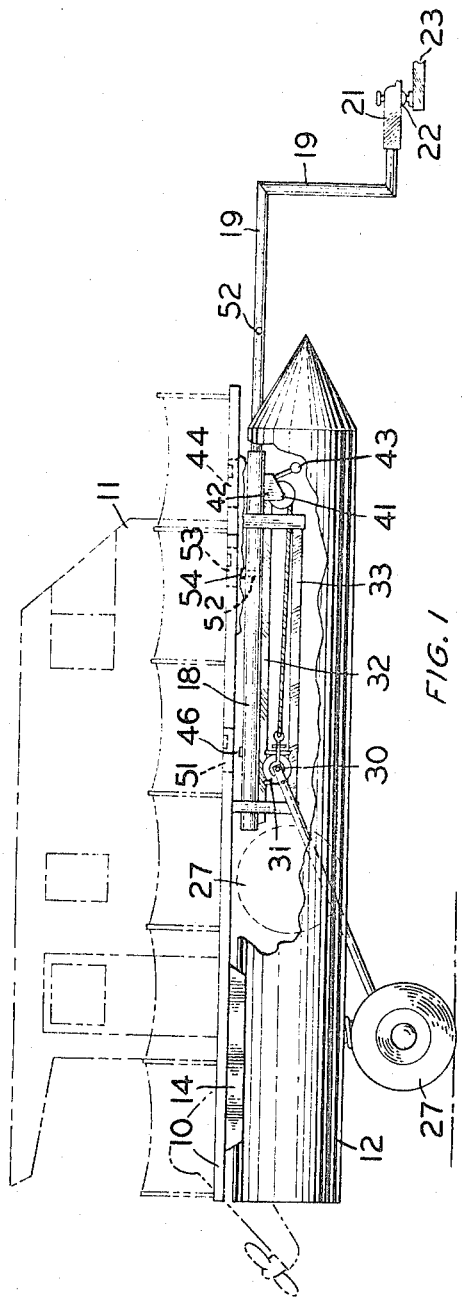
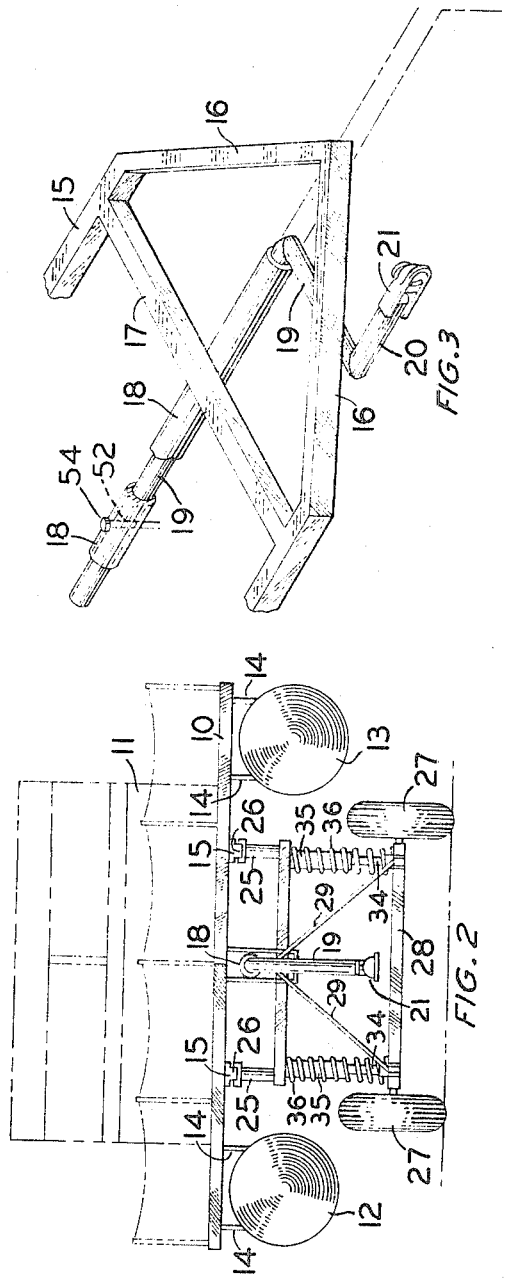
INVENTORS.
WAYNE D. ISCH
WALTER J. LAWRENCE, SR.

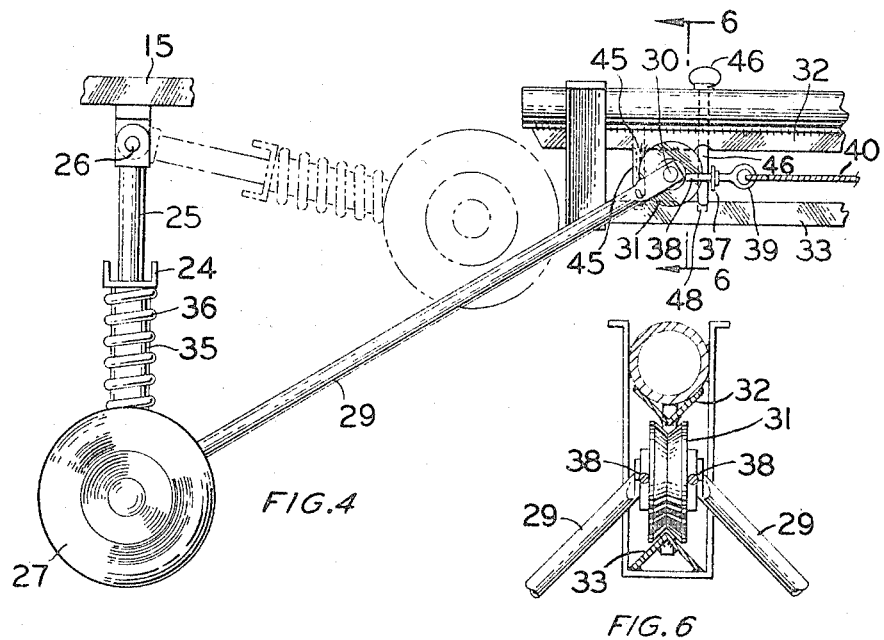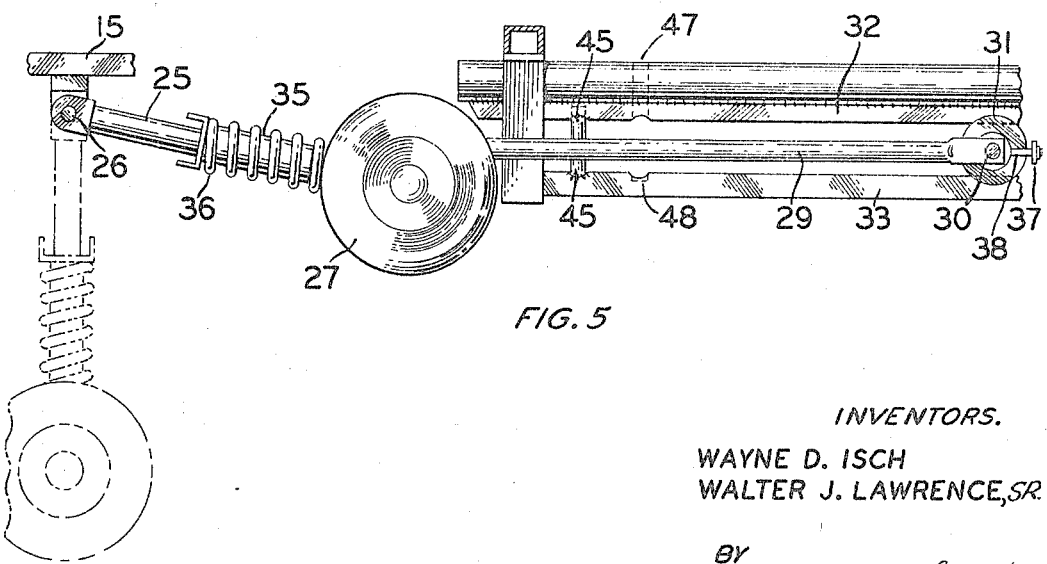

United States Patent Office 3,289,225
Patented Dec. 6, 1966

3,289,225
CONVERTIBLE TRAILER AND PONTOON
BOAT CONSTRUCTION
Wayne D. Isch, 285 S. Adam St., Mansfield, Ohio, and
Walter J. Lawrence, Sr., 114 Tamarac Drive, Lexington, Ohio
Filed Feb. 1, 1965, Ser. No. 429,597
2 Claims. (Cl. 9—1)

This invention is an improvement in convertible trailer and pontoon boat constructions and more particularly wherein an undercarriage is provided for overland hauling and for launching the pontoon boat into a body of water and in which the undercarriage can readily be retracted for water travel.

It is an object of this invention to provide a high simplicity of construction and durability in use, either overland as a boat trailer or in a water vehicle.

Another object is an improved spring cushion support for the boat and trailer in overland transportation and particularly during launching of the boat in shallow water and until the boat reaches a water depth sufficient to float it.

A further object is to provide means by which the undercarriage may readily and easily be retracted after launching of the boat trailer and locked into nested position below the deck of the boat and between the pontoons or floats supporting the boat in the water.

A still further object is to provide a motor mount by which the draft of the motor can be adjusted by the operator standing on the deck while running in shallow water, thus affording protection for the screw driven by the motor.

Another object is to provide a retractible undercarriage for the running gear which can be automatically locked in retracted position and which can easily be reached for operation by access from the above through trap doors in the deck.

A still further object is to provide an undercarriage including a draft bar capable of rotary and sliding movement and having a hitch coupler on its free end whereby the bar may be extended from the undercarriage for coupling with a complementary hitch member carried by the towing vehicle, and locked in such position, and whereby the bar may readily be unhitched, rotated and retracted independently of the retractible undercarriage to a storage position beneath the boat deck and between the supporting pontoons.

Other objects and advantages of this invention will become more apparent as the following description of an embodiment thereof progresses, reference being made to the accompanying drawing in which like reference characters are employed to designate like parts throughout the same.

In the drawings:

FIGURE 1 is a side elevation of a convertible land trailer and pontoon boat construction illustrating an embodiment of the invention in use as a land vehicle;

FIGURE 2 is a front end view of the same;

FIGURE 3 is a perspective view showing the retractible, rotatable draft bar assembly;

FIGURE 4 is a side elevation of the chassis and undercarriage shown in position in solid lines for supporting the trailer vehicle on land after transporting the same to and from a launch site;

FIGURE 5 is a view similar to that in FIGURE 4 and shows the parts in full line position when the undercarriage and running gear are retracted; and FIGURE 6 is a vertical section taken on line 6—6 of FIGURE 5 in the direction of the arrows.

In carrying out the invention as illustrated in the embodiment of the drawings shown, the deck of the pontoon boat is shown at 10 on which may be mounted any suitable superstructure, cabin or the like, indicated at 11. For supporting the boat in the water, there is provided a pair of pontoons 12 and 13 extending along and suspended below the opposite two sides of the deck by means of hangers 14. The forward portion of the supporting frame 15 of the deck terminates in a pair of forwardly converging rails 16 and a cross bar 17 below which is secured a tube 18 preferably by welding the same to the frame, which is adapted to slidably and rotatably receive the draft bar 19. The draft bar, at its forward end, is formed with a portion which is normal to the main body of the bar and with a forward portion 20 on which is secured a hitch member 21 which is adapted for coupling with a complementary hitch member 22 carried at the rear of the towing vehicle (not shown) on rail 23.

The retractible undercarriage is mounted at the rear portion of the deck 10 and includes a cross rail 24 attached to and suspended below a pair of arms 25 each having pivotal connection as at 26 with the deck frame 15. The undercarriage also includes running gear such as tired wheels 27 rotatably carried on each end of the axle member 28 which, in turn, is pivotally connected to the tie bars 29 at one end. The tie bars converge forwardly of the undercarriage and are pivotally connected to a short shaft or axle 30 on which a grooved wheel or pulley 31 is freely rotatably carried.

The grooved wheel 31 travels along the upper and lower V guide rails 32 and 33, respectively, which are suspended from the deck, and with the rails substantially parallel to one another and disposed in the wheel groove, the lower inverted V rail 33 acts as a supporting rail for the wheel 31 while the upper rail serves to guide the rail in its movement therealong when the undercarriage is raised or lowered and also to prevent derailment of the wheel. The axle 28 carries a pair of shock absorber pistons 34 upwardly disposed near each end of the axle for slidable and telescopic movement in and along the shock absorber cylinders 35. Coiled compression springs 36 surrounding the cylinders and pistons engage at their ends under forces of compression with the cross rail 24 and the axle 28. The combined effectiveness of the shock absorbers and the compression coils is highly desirable especially in launching the pontoon boat while the wheels are still down.

In order to raise and lower the running gear out of and into traction position with the ground, there is provided a yoke 37 having portions 38 extending rearwardly along the sides of the wheel 31 and attached to the short shaft or axle 30 and terminating forwardly of and beyond the wheel in an eye 39 to which one end of the cable 40 is secured. The other end of the cable is secured in a winch, indicated generally at 41, mounted securely on the forward end portion of the rail 18, as at 42. A conventional ratchet type winch may be employed having an operating crank 43. Easy access to the crank may be had from above the deck through an opening in the deck covered by a removable trap door 44, thus affording ready access to the winch and its crank from the deck. A stop consisting of a pin or bolt 45 is provided behind the grooved wheel 31, as to the left thereof in FIGURES 1, 4 and 5, and is welded to and connects the rails 32 and 33 at 45′. A removable headed pin 46 is insertable in aligned openings in the rails 32 and 33 and, when the undercarriage is down, as in FIGURES 1, 2 and 4, this pin is disposed in the groove of the wheel 31 opposite the pin 45. In this manner the undercarriage is locked in the running position. The pin 46 may be removed through an access hole in the deck 10 covered by a trap door indicated at 51 on the deck.

Ordinarily the pin 45 being fixed in position acts as a stop to prevent travel of the wheel 31 to the left beyond the position shown in FIGURE 4 and, of course, while the pin 46 is in place, as shown in this view, movement of the wheel to the right is prevented. However, when it is desired to retract the running gear and carriage to the position shown in FIGURE 5, the pin 46 must be removed. Then, upon operating the ratchet winch in the proper direction, the cable will travel to the right and draw the grooved wheel in that direction along the rails 32 and 33 to retract the running gear and carriage to the nested position under the deck and frame and between the pontoons 12 and 13.

It is to be noted that the draw bar 19 is telescopically and rotatably carried in the frame tube 18 and is provided with transverse holes as at 47 and 52. These holes are disposed at substantially right angles to each other so that in the position shown in FIGURE 1 with the draw bar extended, the hole 52 is exposed and horizontally disposed while the hole 47 is vertically disposed in alignment with an opening through the tube 18 located below the trap door 53 to receive a locking pin 54. When the draw bar 19 is retracted and rotated as in full lines in FIGURE 3, having first been unhitched from the towing vehicle, it is locked in such retracted position by the headed pin 54 inserted into the opening 52 and the aligned hole in the tube 18, as at 47. Since the draw bar is moved rearwardly a distance sufficient to bring the hole 47 in the bar into alignment with the opening in the tube 18 which receives the pin 46, the draw bar will be firmly locked in retracted position.

From the above, it will be seen that the convertible pontoon trailer is readily converted from a land trailer to a water vehicle. To be towed, the convertible trailer is hitched to a towing vehicle, as illustrated in FIGURE 1, with the draw bar 19 extended from the tube 18 and turned approximately 90° so that the arm carrying the complementary hitch member is in a substantially vertical position. With the running gear in full line position in this figure, and the pins 54 and 46 in position to intersect the tube 18 and the draw bar 19, the pontoon trailer is ready to be transported to a launching site by the towing vehicle.

The pontoon trailer may be backed into the water until the pontoons are submerged to a point affording sufficient buoyance to support the trailer and to permit the running gear to be retracted. The pins 46 and 54 are removed through the respective trap doors and the winch 41 is operated by turning the crank 43 accessible through the trap door 44 to wind up the cable 40 on the winch wheel and to draw the grooved wheel 31 to the right, as in FIGURE 5. When the complementary hitch members are disengaged, the draw bar 19 is rotated approximately 90° and the draw bar is then pushed toward the left, as in FIGURE 1, until the hole 52 is in alignment with the hole 47 in the tube 18 to receive the pin 54. At the same time, the pin 46 may be replaced through the tube 18 in the hole 47 in the draw bar to firmly retain the draw bar in its retracted position.

Obviously, this operation is reversed when it is desired to remove the pontoon trailer from the water and to rehitch it to the towing vehicle.

Various changes may be made in the details of construction and arrangement of parts of the invention without departing from the spirit thereof or the scope of the appended claims.

We claim:

1. In a convertible trailer and pontoon boat construction, a boat deck, spaced apart pontoons suspended below the deck along opposite sides thereof, a draft bar tube, a draft bar telescopically carried in the tube for extension forwardly beyond the deck and retractible to store the same within the confines of the deck and between the pontoons, said draft bar having rotative movement in said tube, said tube and said bar having a plurality of openings to be brought into selective alignment respectively for receiving fasteners whereby to releasably lock the tube and bar in selected extended, retracted and rotated relation, a running gear assembly hingedly supported below the deck and movable to and from a nested position between said pontoons, means for effecting such movement, and means limiting such movement in either direction, a pair of vertically spaced apart rails suspended from said deck in vertical alignment with said telescopic tube and draft bar, a grooved wheel carried by the running gear for travel along and between said rails, and means connected with said wheel and operable from access through the deck to retract the running gear to its nested position between the pontoons.

2. In a convertible trailer and pontoon boat construction, a boat deck, spaced apart pontoons suspended below the deck along opposite sides thereof, a draft bar tube, a draft bar telescopically carried in the tube for extension forwardly beyond the deck and retractible to store the same within the confines of the deck and between the pontoons, said draft bar having rotative movement in said tube, said tube and said bar having a plurality of openings to be brought into selective alignment respectively for receiving fasteners whereby to releasably lock the tube and bar in selected extended, retracted and rotated relation, a running gear assembly hingedly supported below the deck and movable to and from a nested position between said pontoons, means for effecting such movement, and means limiting such movement in either direction, a pair of vertically spaced apart rails suspended from said deck in vertical alignment with said telescopic tube and draft bar, a member supported on one of said rails and guided by said rails for movement therealong in opposite directions, tie bars converging from said running gear and pivotally connected at their converging ends to said member, and means operable from access through the deck to move said member to retract the running gear to its nested position between the pontoons, and releasable to return the running gear to non-nested position to support the trailer in land travel.

References Cited by the Examiner

UNITED STATES PATENTS

| | | | |
|---|---|---|---|
| 1,711,059 | 4/1929 | Marklein | 280—150.5 |
| 2,290,308 | 7/1942 | Winn | 280—429 |
| 2,759,201 | 8/1956 | McKinney | 9—1 |
| 2,851,705 | 9/1958 | Smith et al. | 9—1 |
| 3,052,202 | 9/1962 | Dearborn | 9—1 |
| 3,203,014 | 8/1965 | Krueger | 9—1 |
| 3,210,783 | 10/1965 | Petty | 9—1 |

FERGUS S. MIDDLETON, *Primary Examiner.*

MILTON BUCHLER, *Examiner.*

T. M. BLIX, *Assistant Examiner.*